US007861208B2

(12) United States Patent
Faure et al.

(10) Patent No.: US 7,861,208 B2
(45) Date of Patent: *Dec. 28, 2010

(54) STRUCTURE FOR PARTITIONED DUMMY FILL SHAPES FOR REDUCED MASK BIAS WITH ALTERNATING PHASE SHIFT MASKS

(75) Inventors: Thomas B. Faure, Milton, VT (US); Howard S. Landis, Underhill, VT (US); Jeanne-Tania Sucharitaves, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 198 days.

This patent is subject to a terminal disclaimer.

(21) Appl. No.: 11/872,924

(22) Filed: Oct. 16, 2007

(65) Prior Publication Data

US 2009/0100399 A1 Apr. 16, 2009

(51) Int. Cl.
*G06F 17/50* (2006.01)
(52) U.S. Cl. .............................. 716/19; 716/2
(58) Field of Classification Search ................ 716/19
See application file for complete search history.

(56) References Cited

U.S. PATENT DOCUMENTS

| 5,032,890 | A | 7/1991 | Ushiku et al. |
| 5,537,648 | A | 7/1996 | Liebmann et al. |
| 5,636,131 | A | 6/1997 | Liebmann et al. |
| 5,763,955 | A | 6/1998 | Findley et al. |
| 5,932,563 | A | 8/1999 | Stokes et al. |
| 6,057,063 | A | 5/2000 | Liebmann et al. |
| 7,383,521 | B2* | 6/2008 | Smith et al. ............... 716/6 |
| 2003/0106037 | A1 | 6/2003 | Moniwa et al. |
| 2003/0229875 | A1* | 12/2003 | Smith et al. ............... 716/10 |
| 2004/0110069 | A1 | 6/2004 | Lercel et al. |
| 2005/0031972 | A1 | 2/2005 | Cote et al. |
| 2005/0114824 | A1* | 5/2005 | Wang et al. ............... 716/21 |
| 2005/0153212 | A1 | 7/2005 | Lavin et al. |
| 2007/0166887 | A1* | 7/2007 | Chen et al. ............... 438/129 |
| 2008/0086714 | A1* | 4/2008 | Faure et al. ............... 716/19 |
| 2008/0203589 | A1* | 8/2008 | Bailey et al. ............... 257/797 |

OTHER PUBLICATIONS

Office Action in U.S. Appl. No. 11/539,204, dated Apr. 1, 2009.
Lee et al, "Using Smart Dummy Fill and Selective Reverse Etchback for Pattern Density Equalization", Proc. CMP-MIC, Mar. 2000, pp. 255-258.
Notice of Allowance in U.S. Appl. No. 11/539,204, dated Dec. 17, 2009.

* cited by examiner

*Primary Examiner*—Vuthe Siek
*Assistant Examiner*—Patrick Sandoval
(74) *Attorney, Agent, or Firm*—Richard Kotulak; Roberts Mlotkowski Safran & Cole, P.C

(57) ABSTRACT

A design structure, method, and system for partitioned dummy fill shapes for reduced mask bias with alternating phase shift masks, or with other two-mask lithographic processes employing a trim mask. A design structure is embodied in a machine readable medium used in a design process, the design structure comprising regions in a finished semiconductor design that do not contain as-designed shapes. The design structure additionally includes dummy fill shapes in the regions at a predetermined final density, wherein the generated dummy shapes are sized so that their local density is increased to a predetermined value. Moreover, corresponding trim shapes act to expose an oversized portion of the dummy shape, effectively trimming each dummy shape back to the predetermined final density.

12 Claims, 8 Drawing Sheets

STRUCTURE FOR PARTITIONED DUMMY FILL SHAPES FOR REDUCED MASK BIAS WITH ALTERNATING PHASE SHIFT MASKS

FIELD OF THE INVENTION

The invention relates to a method and system for partitioned dummy fill shapes for reduced mask bias with alternating phase shift masks, or with other two-mask lithographic processes employing a trim mask. The invention further relates to a design structure on which a subject circuit resides.

BACKGROUND DESCRIPTION

Phase shift mask technology allows for much smaller features to be resolved for a given illumination wavelength than conventional Chrome-On-Glass or Attenuated Phase Shift methods. Typically small features are resolved by exposing the spaces on either side through alternating 0-degree and 180-degree phase-shifted openings on a phase mask. The ends of these fine features are normally trimmed by exposure through a second block mask, since it is 0-degree and 180-degree shapes are not normally allowed to touch one another. Large features that could be easily resolved without resorting to alternating phase shift methods are normally rendered by the block mask alone.

For polysilicon gate applications, these large features normally include large decoupling capacitors and dummy fill shapes, among others. Within macros containing a large number of critical gates, the local density of 0-degree and 180-degree shapes (openings in an otherwise opaque mask) is normally about 40-65%, while the density of block shapes (opaque regions in an otherwise clear mask) is normally 70-90%. In other regions of a design, such as otherwise-empty areas containing only dummy fill shapes, the local density of 0-degree and 180-degree shapes is nearly zero, and the density of block shapes is typically 25%. In peripheral areas containing mostly large decoupling capacitors, the 0-degree and 180-degree local density is nearly zero, and the density of block shapes is about 60-75%.

On technology development testsites, there are often companion chiplets surrounding a central product or product-like chip. For these companion chiplets, the local density of 0-degree and 180-degree shapes is very often also nearly zero, and the local density of block shapes, mostly dummy fill, is approximately 25%. As a result, the local density of 0-degree and 180-degree phase shapes varies widely across the phase shift reticle, particularly on large length scales (1 mm or larger). Similarly, the local density of block shapes varies widely across the block reticle, particularly on large length scales. Variations in the local density of shapes are known to have an adverse effect on the dimensional control of features on those masks, and these non-uniformities have been demonstrated to exhibit a strong adverse effect on the manufacturing mask bias for both phase and block reticles. Similar manufacturing difficulties arising from non-uniform density of shapes can adversely affect masks used in other two-mask lithographic processes incorporating an auxiliary trim mask, used for example to create closely-space line ends in an SRAM or other memory array.

Known solutions include a two-pass methodology for mask manufacture, wherein oversized features are trimmed in a second pass through the mask writer. This approach increases the cost and turnaround-time for the masks, has the potential to increase the defect density on those masks, and is inherently a one-way process only. That is, features that were rendered too large can be trimmed, but features that were originally rendered too small cannot be readily adjusted.

SUMMARY OF THE INVENTION

In a first aspect of the invention, a method comprises locating regions in a finished semiconductor design that do not contain as-designed shapes. The method generates dummy fill shapes in the regions at a predetermined final density and sizes the generated dummy shapes so that their local density is increased to a predetermined value. The method further creates corresponding trim shapes that act to expose an oversized portion of the dummy shape, effectively trimming each dummy shape back to the predetermined final density.

In another aspect of the invention, the method is provided for partitioned dummy fill shapes for reduced mask bias with alternating phase shift masks. The method comprises rendering mask patterns as dummy fill shapes partitioned across two masks. The shapes on a first mask are associated with dummy fill shapes which are expanded until their local density is in a desired range. Associated trim shapes on a second mask are used to trim the expanded dummy fill shapes to a desired size.

In further embodiments, the generated dummy shapes are sized on a block mask and, for each oversized dummy fill shape, corresponding trim shapes are created on a phase mask. In yet another aspect of the invention, a system comprising at least one of a hardware and software component is configured to perform the method steps of the invention.

In a another aspect of the invention, there is a design structure embodied in a computer readable medium for performing a method. The design structure comprises a component for: locating regions in a finished semiconductor design that do not contain as-designed shapes; generating dummy fill shapes in the regions at a predetermined final density; sizing the generated dummy fill shapes so that their local density is increased to a predetermined value; and creating corresponding trim shapes to the dummy fill shapes that act to expose an oversized portion of the dummy fill shapes, effectively trimming each dummy fill shape back to the predetermined final density.

In another aspect of the invention, there is a design structure embodied in a machine readable medium used in a design process, the design structure comprising regions in a finished semiconductor design that do not contain as-designed shapes. The design structure additionally includes dummy fill shapes in the regions at a predetermined final density, wherein the generated dummy shapes are sized so that their local density is increased to a predetermined value. Moreover, corresponding trim shapes act to expose an oversized portion of the dummy shape, effectively trimming each dummy shape back to the predetermined final density.

In embodiments, the design structure comprises a netlist, which describes the circuit. In further embodiments, the design structure resides on storage medium as a data format used for the exchange of layout data of integrated circuits. In even further embodiments, the design structure includes at least one of test data files, characterization data, verification data, or design specifications.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention relates to a method and system for partitioned dummy fill shapes for reduced mask bias with alternating phase shift masks or other two-mask lithographic processes incorporating a trim mask. The invention further relates to a design structure on which a subject circuit resides. In an embodiment of the invention, mask patterns that are rendered as dummy fill shapes are partitioned across two masks, e.g., on a phase mask and a block mask, such that the local density of shapes on both masks can be made significantly more uniform. Specifically, in embodiments, the shapes on the block mask associated with dummy fill are expanded until their local density is in the desired range (e.g., typically 70-90%), and associated trim shapes on the phase mask are used to trim the oversized (expanded) block shapes to their desired size. In this manner, regions containing dummy fill shapes, such as spaces between dense circuit macros, and companion chiplets on a technology development testsite, will exhibit local densities on both the phase mask and block mask that are closer to the densities exhibited by circuit regions containing mostly small, critical features such as SRAM or other memory arrays, or general-purpose logic circuitry.

Figure 1:
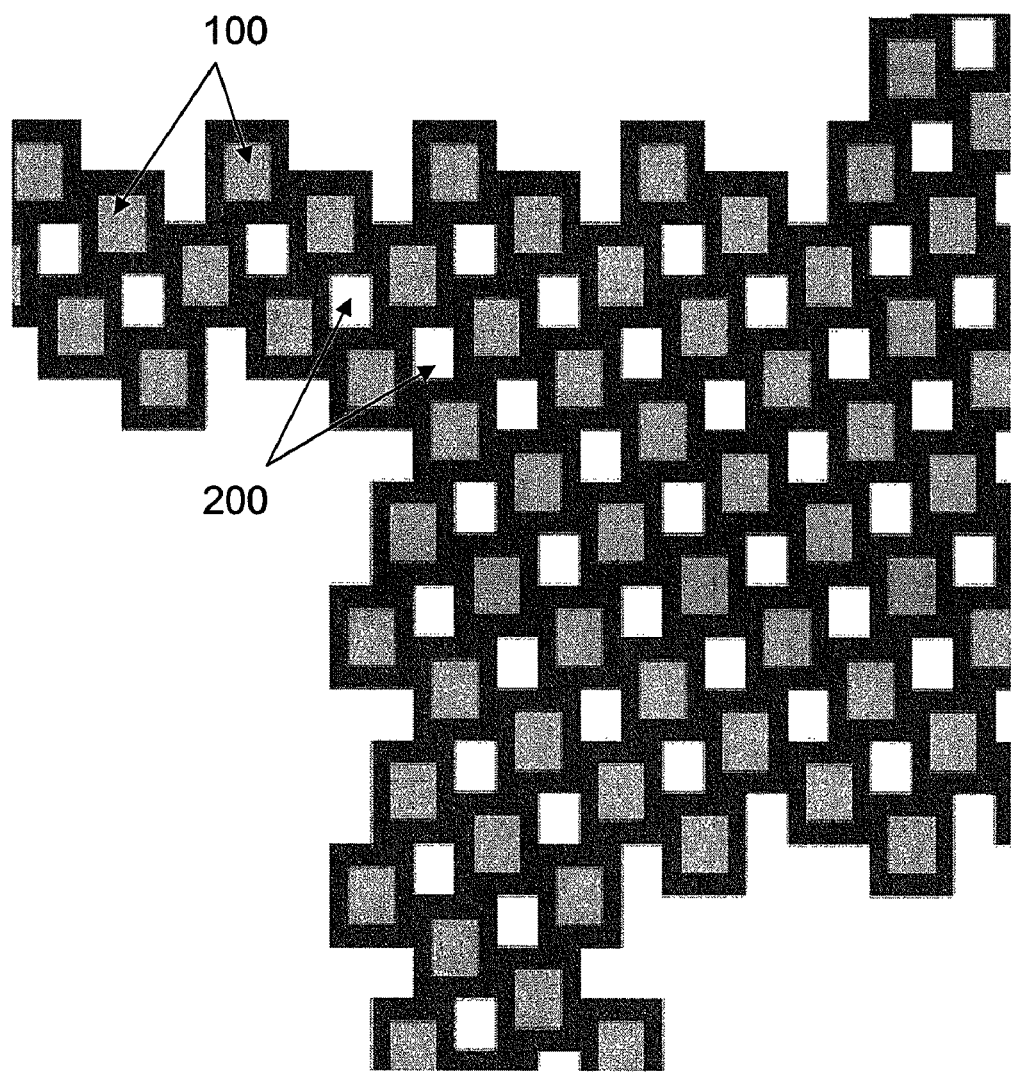
FIG. 1 shows an illustrative example of 25%-density dummy fill shapes constructed as 80%-dense oversized features.

Referring to FIG. 1, as an example, 25%-density dummy fill shapes are constructed as 80%-dense oversized features, and trimmed back to their standard size by 55%-dense 0-degree and/or 180-degree dummy trim shapes. More specifically, in FIG. 1, oversized dummy fill shapes 100 for the phase mask are oversized to reach the desired local density, in this case 80%. With this arrangement of dummy fill shapes 100, adjacent shapes abut at 80% local density. Donut-shaped dummy 0-degree and/or 180-degree dummy shapes 200 are used to trim the oversized dummy fill shapes back to their desired final density. Other arrangements of dummy fill shapes that are commonly used in the industry, such as square or rectangular dummy shapes, can be oversized and trimmed in the manner described in accordance with the invention.

Figure 2:
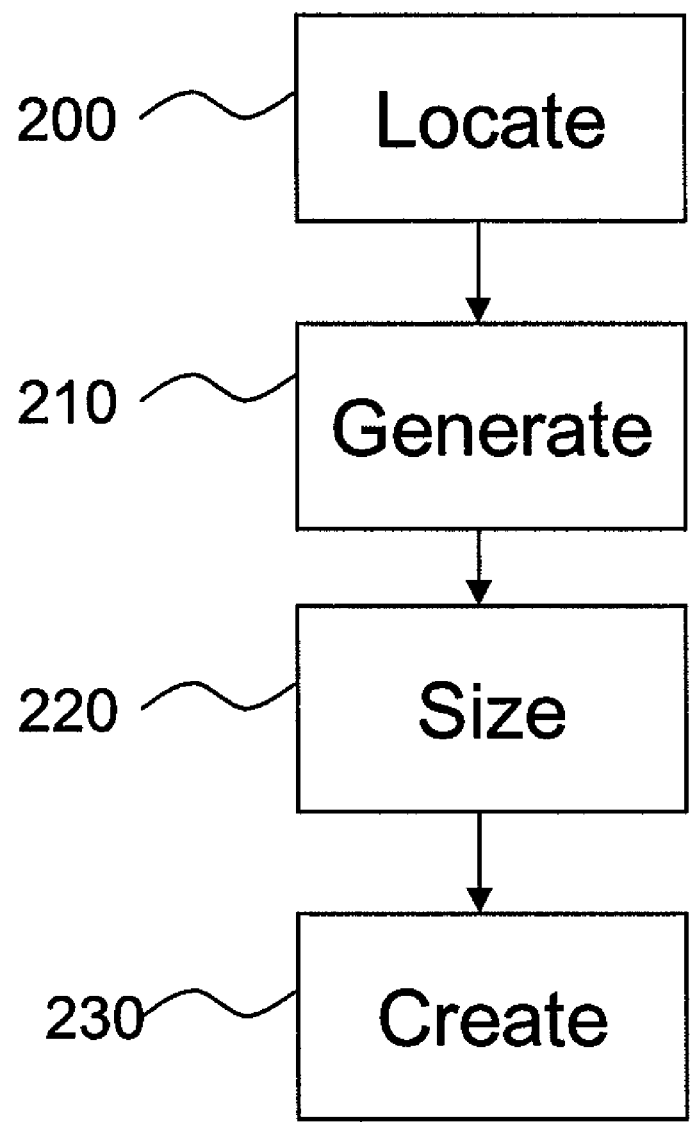
FIG. 2 is a flow diagram implementing steps of the invention.

FIG. 2 is a flow diagram implementing steps of the invention. FIG. 2 may equally be a high level block diagram implementing the steps thereof. The steps of FIG. 2 may be implemented and executed in the environment of FIG. 1. Additionally, the invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The medium can be an electronic, magnetic, optical, electromagnetic, infrared, or semiconductor system (or system or device) or a propagation medium, all of which are known to those of skill in the art.

Referring back to FIG. 2, at step 200, the process locates regions in a finished semiconductor design that do not contain as-designed shapes on levels of interest. These regions are available for dummy fill shapes. In these regions, at step 210, the process generates dummy fill shapes at a desired (predetermined) final density (e.g., about 25%) in a manner known to those of skill in the art. (See, FIG. 3.)

At step 220, the process sizes all of the generated dummy shapes so that their local density is increased to the desired value (e.g., about 80%). (See, FIG. 4.) The dummy fill shapes should have sufficient spacing from functional shapes to allow the expansions to take place without encroaching on the as-designed functional shapes. For example, sufficient spacing encompasses the dummy shapes not touching or otherwise coming too close to functional features as a result of the expansion in FIG. 4. Too close is normally specified as part of the general rules for acceptable placement of dummy fill shapes. These expanded shapes are rendered on the block mask. At step 230, for each oversized dummy fill shape, the process creates corresponding trim shapes that act to expose the oversized portion of the dummy shape, effectively trimming each dummy shape back to the desired final density (about 25%). In one non-limiting example, the local density of dummy 0-degree and/or 180-degree dummy-trim shapes is about 55%. (See, FIG. 5). These shapes are rendered on the phase mask.

In embodiments, the edges of the dummy trim shapes can be coincident with the edges of the dummy block shapes that they act upon, or the trim shapes can extend beyond (overlap) the edges of the dummy block shapes. In embodiments, the overlap can be as large or as small as may useful in achieving the desired densities for each mask. Tautologically, the overlap can be as small as zero—no overlap—or fully as large as the smaller of the dummy shape of the trim shape, for example. This overlap can increase the acceptable process window for misalignment between the two masks, and can also increase the local density of 0-degree and/or 180-degree trim shapes, independent of the local density of dummy shapes on the block mask. This fine-tuning of the phase and block densities is helpful in adjusting the total exposure for small local regions, as the local dose can have a strong effect on lithographic bias.

Figure 3:
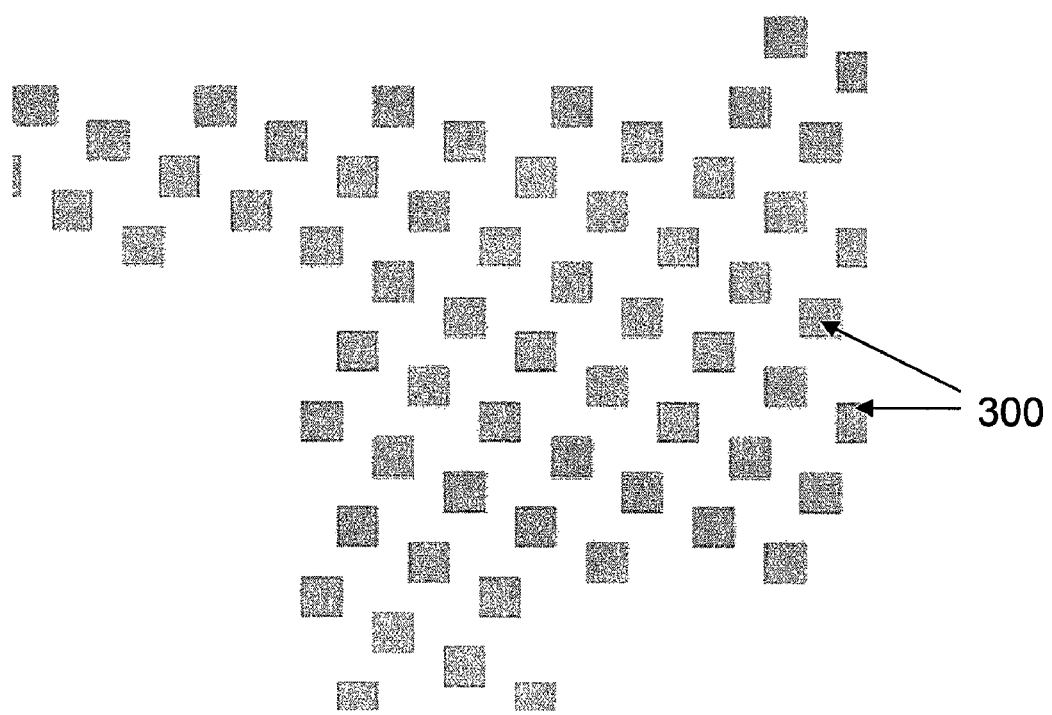
FIG. 3 graphically represents dummy fill shapes in accordance with the invention.

FIG. 3 shows regions 300 that are available for dummy fill shapes. In these regions 300, the process generates dummy fill shapes at the desired final density (e.g., about 25%) in a manner known to those of sill in the art. As discussed above, the dummy fill shapes have sufficient spacing from functional shapes to allow the expansions to take place without significantly encroaching on the as-designed functional shapes.

Figure 4:
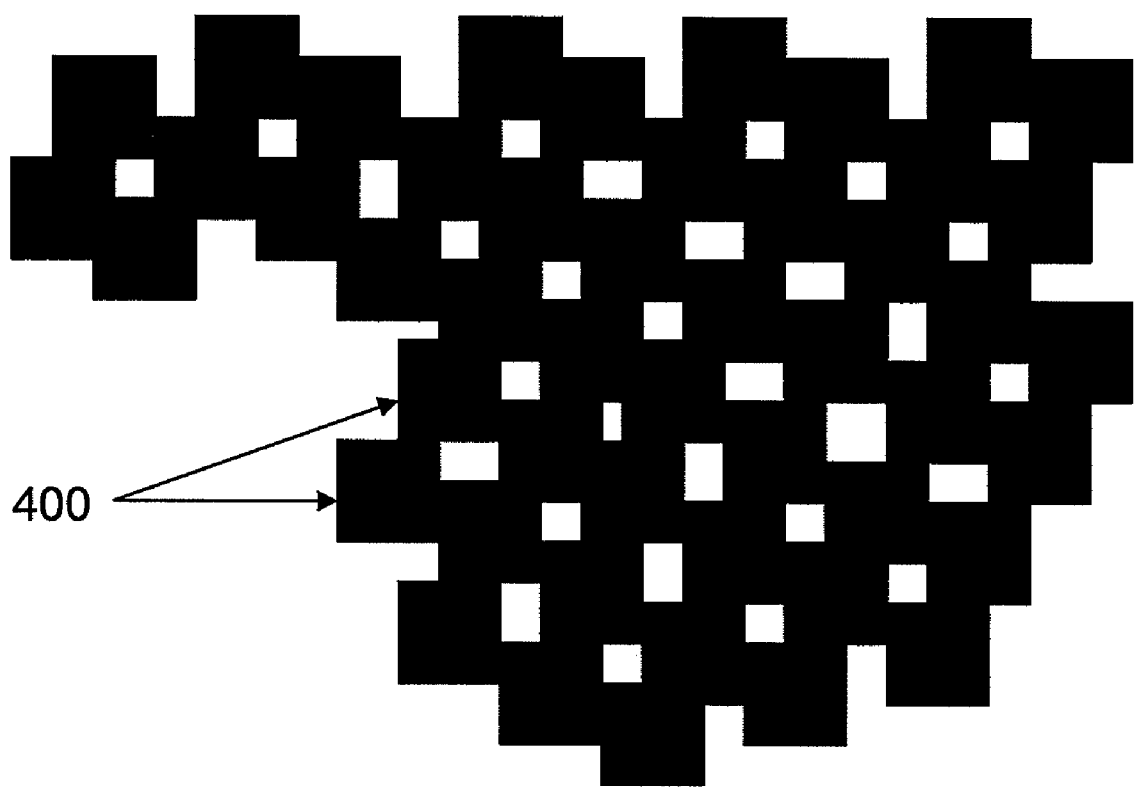
FIG. 4 graphically represents dummy fill shapes in accordance with the invention.

FIG. 4 shows oversized dummy fill shapes 400 in accordance with the invention. As previously discussed, the process of the invention sizes all of the generated dummy shapes so that their local density is increased to the desired value (e.g., about 80%).

Figure 5:
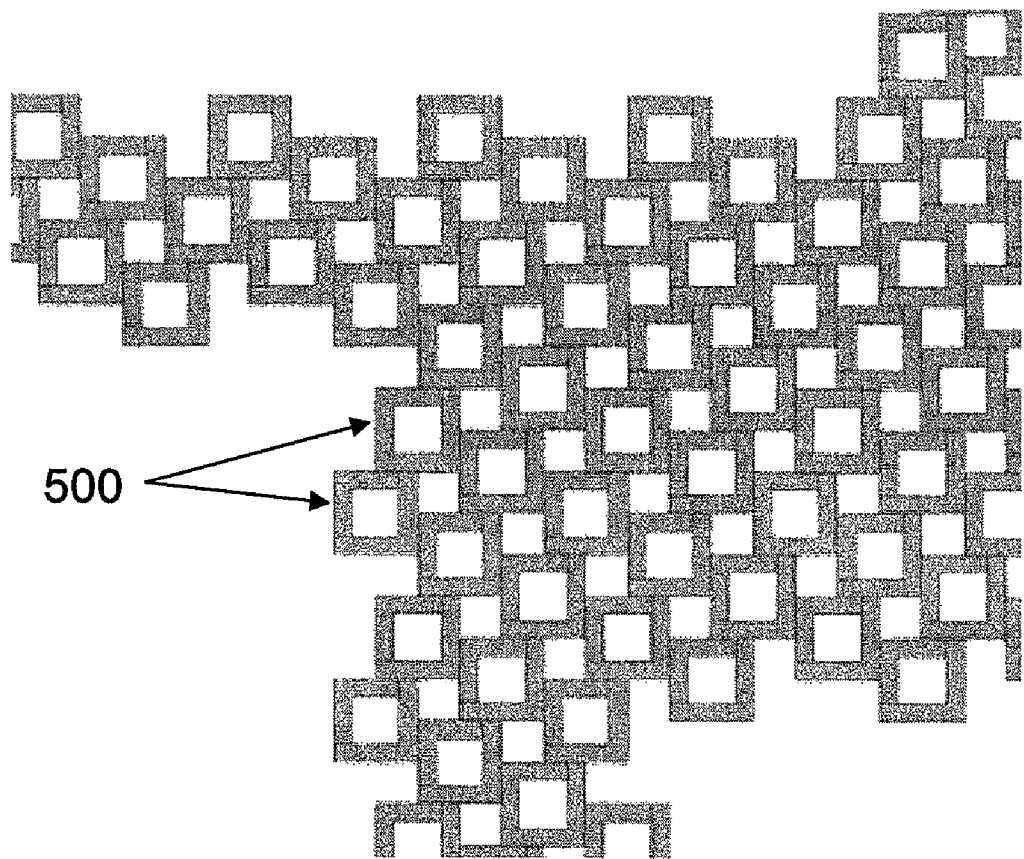
FIG. 5 graphically represents dummy-trim shapes in accordance with the invention.

FIG. 5 shows dummy fill shapes 500 in the phase mask. In one non-limiting example, the local density of dummy 0-degree and/or 180-degree dummy-trim shapes is about 55%. It should be understood, though, that the local density of dummy 0-degree and/or 180-degree dummy-trim shapes can be other percentages.

Figure 6:
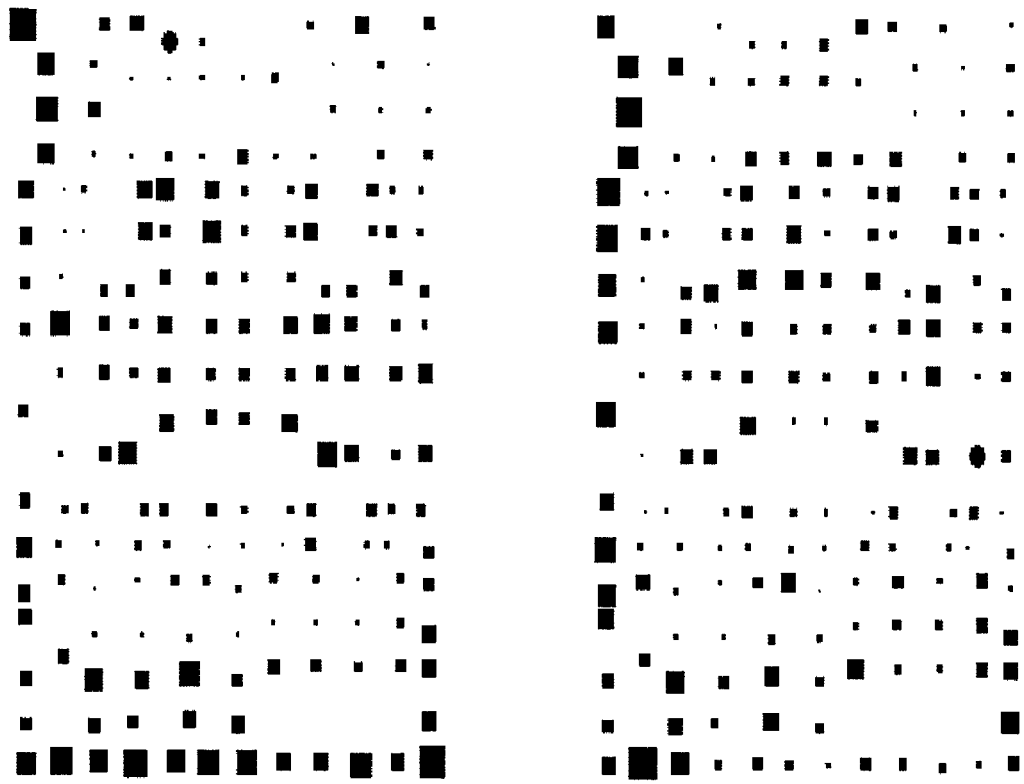
FIG. 6 graphically shows a decrease in the block mask bias in accordance with the invention.

The structures and methods in this disclosure can be applied to any semiconductor level that is rendered by alternating phase shift methods, and is not limited to a polysilicon gate level which is one illustrative example. Additionally, the approach described herein has been shown to decrease the block mask bias by 50%, as shown experimentally in FIG. 6. More specifically, as shown in FIG. 6, the new fill has about 80% overetch and about 60% duty cycle during overetch.

Figure 7:
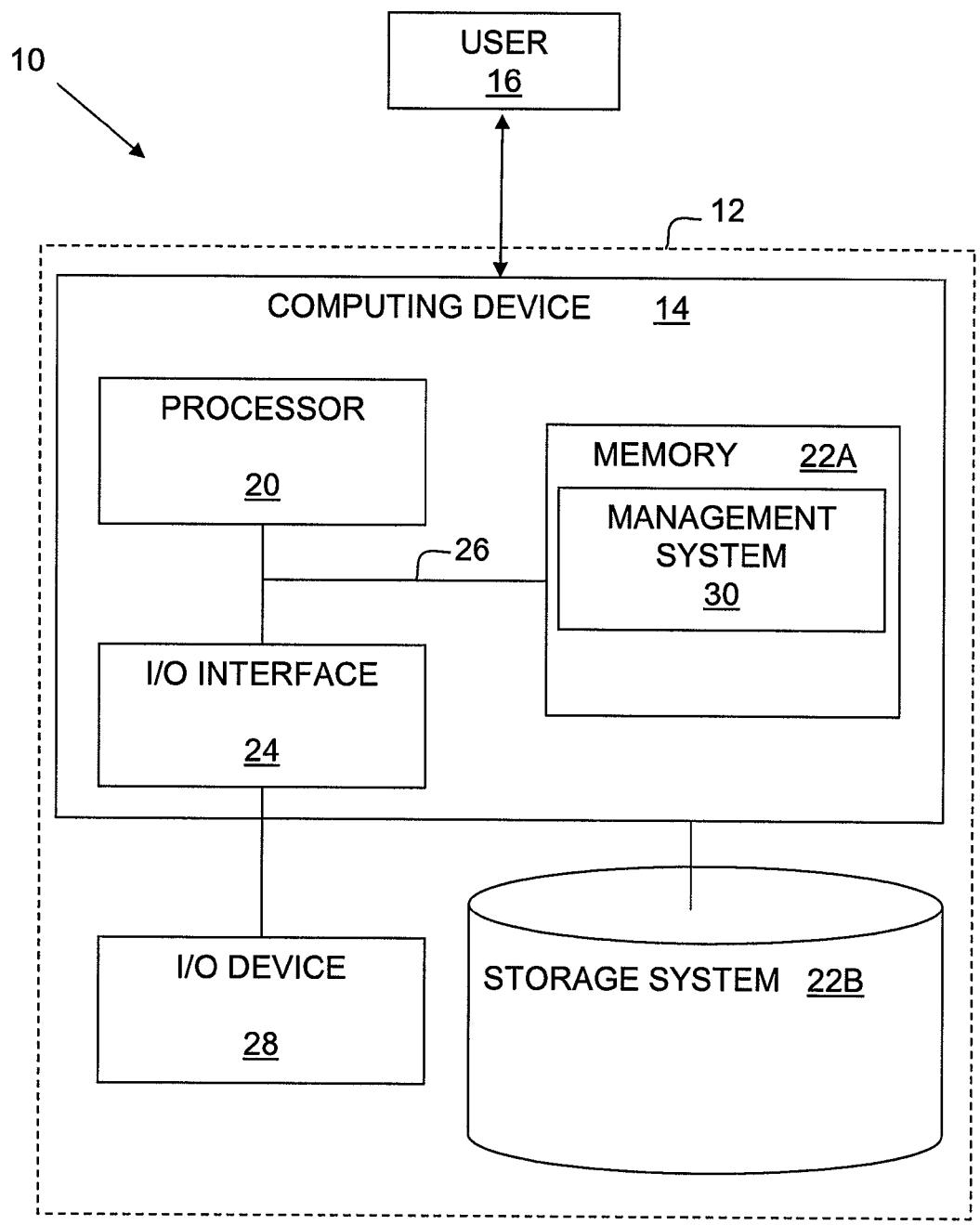
FIG. 7 is representative of a system implementing the invention.

FIG. 7 shows an illustrative environment 10 for managing and applying the processes in accordance with the invention. To this extent, the environment 10 includes a computer infrastructure 12 that can perform the processes described herein. In particular, the computer infrastructure 12 is includes a computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. The processor 20 executes computer program code, which is stored in memory 22A and/or storage system 22B. While executing computer program code, the processor 20 can read and/or write data, such as the required information to generate and trim dummy fill shapes, in accordance with the invention. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). In embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Figure 8:
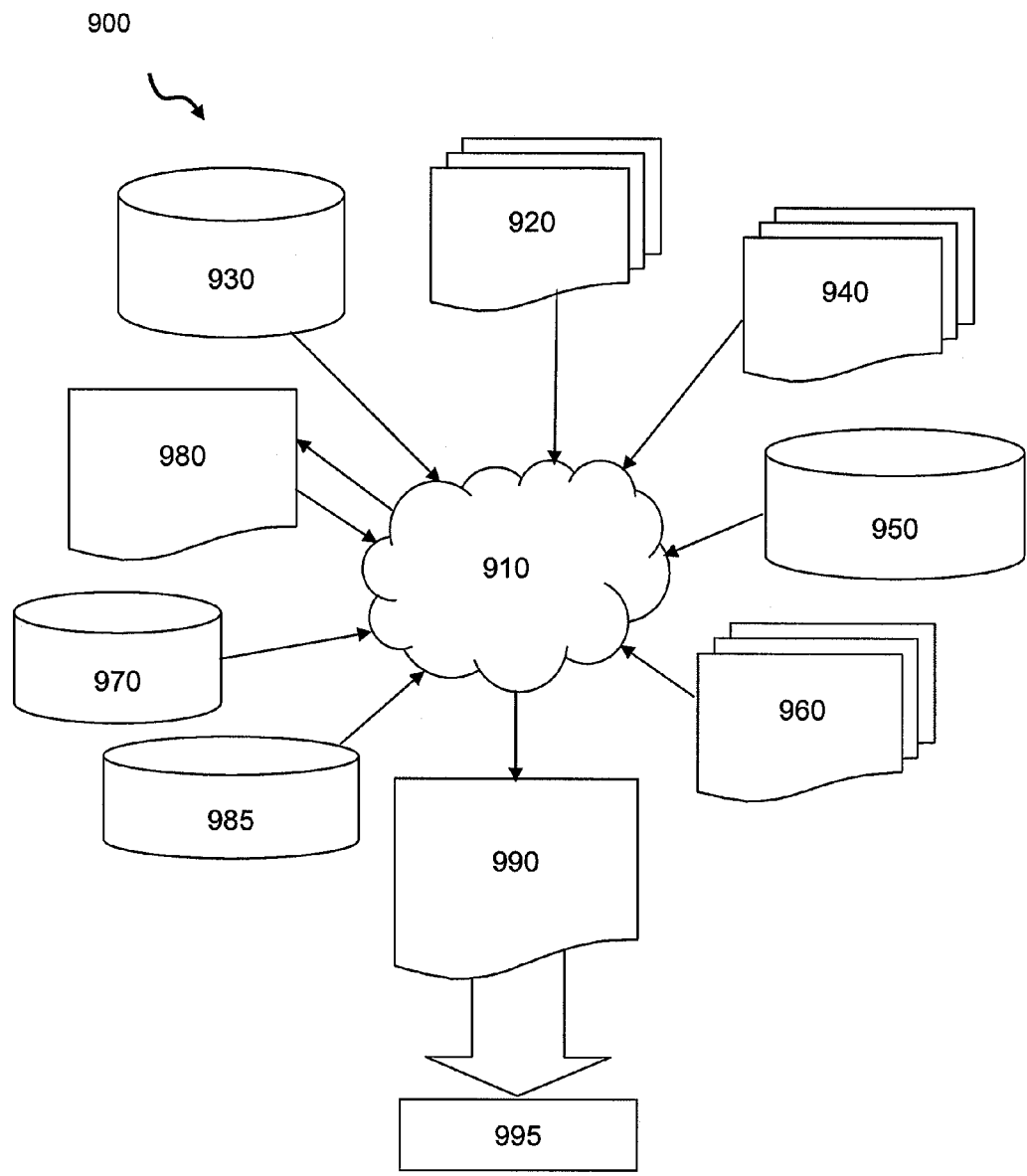
FIG. 8 is a flow diagram of a design process used in semiconductor design, manufacturing, and/or test.

FIG. 8 shows a block diagram of an example design flow 900. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises a circuit and/or structure (such as, for example, that as shown in any one of FIGS. 1 and 3-6) in the form of schematics or HDL, a hardware-description language (e.g., Verilog, VHDL, C, etc.). Design structure 920 may be contained on one or more machine readable medium. For example, design structure 920 may be a text file or a graphical representation of a circuit and/or structure (such as, for example, that as shown in any one of FIGS. 1 and 3-6). Design process 910 preferably synthesizes (or translates) a circuit and/or structure (such as, for example, that as shown in any one of FIGS. 1 and 3-6) into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in any one of FIGS. 1 and 3-6, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in any one of FIGS. 1 and 3-6. Design structure 990 may then proceed to a stage 995 where, for example, design structure 990 proceeds to tapeout, is released to manufacturing, is released to a mask house, is sent to another design house, is sent back to the customer, etc.

Additionally, the method as described herein is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A computer program product for a design structure of a circuit, the computer program product comprising computer program code embodied in a non-transitory computer readable storage medium, which, when executed on a computing device, causes the computing device to:
   locate regions in a finished semiconductor design that do not contain as-designed shapes;
   generate dummy fill shapes in the regions at a predetermined final density;
   expand the generated dummy fill shapes so that their local density is increased to a predetermined value; and
   create corresponding trim shapes to the expanded dummy fill shapes that act to expose an oversized portion of the expanded dummy fill shapes, effectively trimming each expanded dummy fill shape back to the predetermined final density.

2. The computer program product of claim 1, wherein one of:
   edges of the trim shapes are coincident with edges of the expanded dummy fill shapes that they act upon; and
   the trim shapes overlap edges of the expanded dummy fill shapes.

3. The computer program product of claim 1, wherein the design structure comprises a netlist, which describes the circuit.

4. A design structure in the format of a text file or a graphical representation of a circuit, the design structure stored in a machine readable device used in a design process, the design structure comprising:
   regions in a finished semiconductor design that do not contain as-designed shapes;
   dummy fill shapes in the regions at a predetermined final density;
   wherein the dummy fill shapes are expanded so that their local density is increased to a predetermined value; and
   corresponding trim shapes that act to expose an oversized portion of the expanded dummy fill shapes, effectively trimming each expanded dummy fill shape back to the predetermined final density.

5. The design structure of claim 4, wherein the design structure comprises a netlist, which describes the circuit.

6. The design structure of claim 4, wherein the design structure resides on the device as a data format used for the exchange of layout data of integrated circuits.

7. The design structure of claim 4, wherein the design structure includes at least one of test data files, characterization data, verification data, or design specifications.

8. The design structure of claim 4, wherein one of:
   edges of the trim shapes are coincident with edges of the expanded dummy fill shapes that they act upon; and
   the trim shapes overlap edges of the expanded dummy fill shapes.

9. A design structure in the format of a text file or a graphical representation of a circuit, the design structure stored in a machine readable device used in a design process, the design structure comprising:
   regions in a finished semiconductor design that do not contain as-designed shapes;
   dummy fill shapes in the regions at a predetermined final density;
   wherein the dummy fill shapes are expanded so that their local density is increased to a predetermined value; and
   corresponding trim shapes that act to expose an oversized portion of the expanded dummy fill shapes, effectively trimming each expanded dummy fill shape back to the predetermined final density,
   wherein one of:
      edges of the trim shapes are coincident with edges of the expanded dummy fill shapes that they act upon; and
      the trim shapes overlap edges of the expanded dummy fill shapes, and
   wherein the overlap increases acceptable process window for misalignment between two masks and increases local density of 0-degree and/or 180-degree trim shapes, independent of the local density of dummy shapes on a block mask of the two masks.

10. A design structure in the format of a text file or a graphical representation of a circuit, the design structure stored in a machine readable device used in a design process, the design structure comprising:
   regions in a finished semiconductor design that do not contain as-designed shapes;
   dummy fill shapes in the regions at a predetermined final density;
   wherein the dummy fill shapes are expanded so that their local density is increased to a predetermined value;
   corresponding trim shapes that act to expose an oversized portion of the expanded dummy fill shapes, effectively trimming each expanded dummy fill shape back to the predetermined final density;
   the trim shapes overlap edges of the expanded dummy fill shapes, and
   the overlap increases acceptable process window for misalignment between two masks and increases local density of 0-degree and/or 180-degree trim shapes, independent of the local density of dummy shapes on a block mask of the two masks.

11. A computer program product for a design structure of a circuit, the computer program product comprising computer program code embodied in a non-transitory computer readable storage medium, which, when executed on a computing device, causes the computing device to:
   locate regions in a finished semiconductor design that do not contain as-designed shapes;
   generate dummy fill shapes in the regions at a predetermined final density;
   expand the generated dummy fill shapes so that their local density is increased to a predetermined value; and
   create corresponding trim shapes to the expanded dummy fill shapes that act to expose an oversized portion of the expanded dummy fill shapes, effectively trimming each expanded dummy fill shape back to the predetermined final density,
   wherein one of:
      edges of the trim shapes are coincident with edges of the expanded dummy fill shapes that they act upon; and
      the trim shapes overlap edges of the expanded dummy fill shapes, and
   wherein the overlap increases acceptable process window for misalignment between two masks and increases local density of 0-degree and/or 180-degree trim shapes, independent of the local density of dummy shapes on a block mask of the two masks.

12. A computer program product for a design structure of a circuit, the computer program product comprising computer program code embodied in a non-transitory computer readable storage medium, which, when executed on a computing device, causes the computing device to:
   locate regions in a finished semiconductor design that do not contain as-designed shapes;
   generate dummy fill shapes in the regions at a predetermined final density;

expand the generated dummy fill shapes so that their local density is increased to a predetermined value;

create corresponding trim shapes to the expanded dummy fill shapes that act to expose an oversized portion of the expanded dummy fill shapes, effectively trimming each expanded dummy fill shape back to the predetermined final density; the trim shapes overlap edges of the expanded dummy fill shapes, and the overlap increases acceptable process window for misalignment between two masks and increases local density of 0-degree and/or 180-degree trim shapes, independent of the local density of dummy shapes on a block mask of the two masks.

* * * * *